United States Patent [19]

Meyer et al.

[11] Patent Number: 5,764,437
[45] Date of Patent: Jun. 9, 1998

[54] PIVOTING RAMP FOR DYNAMIC LOAD/ UNLOAD FILES

[75] Inventors: Dallas W. Meyer, Burnsville; Zine-Eddine Boutaghou, St. Paul, both of Minn.

[73] Assignee: Seagate Technology, Inc., Scotts Valley, Calif.

[21] Appl. No.: 686,199

[22] Filed: Aug. 1, 1996

Related U.S. Application Data

[60] Provisional application No. 60/010,313 Jan. 22, 1996.

[51] Int. Cl.⁶ .................................................. G11B 5/54
[52] U.S. Cl. ................................................... 360/105
[58] Field of Search .............................. 360/104, 105, 360/106

[56] References Cited

U.S. PATENT DOCUMENTS

| | | | |
|---|---|---|---|
| 4,933,785 | 6/1990 | Morehouse et al. | 360/78.04 |
| 5,025,336 | 6/1991 | Morehouse et al. | 360/97.02 |
| 5,237,472 | 8/1993 | Morehouse et al. | 360/105 |
| 5,289,325 | 2/1994 | Morehouse et al. | 360/105 |
| 5,375,021 | 12/1994 | Boeckner | 360/105 |
| 5,448,436 | 9/1995 | Albrecht | 360/105 |
| 5,467,238 | 11/1995 | Lee et al. | 360/128 |
| 5,550,695 | 8/1996 | Matsumoto | 360/105 |

OTHER PUBLICATIONS

"An Experimental Study of the Parameters that Determine Slider–Disk Contacts During Dynamic Load–Unload", by T.G. Jeong and D.B. Bogy, *Journal of Tribology*, vol. 114, Jul. 1992, pp. 507–514.

"Load/Unload Investigations On A Rotary Actuator Disk Drive", by P.G. Levi and F.E. Talke, *IEEE Transactions on Magnetics*, vol. 28, No. 5, Sep. 1992, pp. 2877–2879.

*Primary Examiner*—Stuart S. Levy
*Assistant Examiner*—David D. Davis
*Attorney, Agent, or Firm*—Westman, Champlin & Kelly, P.A.

[57] ABSTRACT

A ramp is disclosed for use in a disc drive system for loading and unloading a magnetic slider carrying actuator. The actuator is rotatable about an actuator pivot and supports the magnetic slider over a first surface of a magnetic disc. The ramp includes a pivoting arm which rotates about a ramp pivot such that the pivoting arm moves toward an inner diameter of the first magnetic disc surface as the actuator rotates toward an outer diameter of the first magnetic disc surface during unloading of the actuator. A sloped region coupled to the pivoting arm is adapted for receiving the actuator during unloading as the pivoting arm moves toward the inner diameter and as the actuator moves toward the outer diameter.

2 Claims, 5 Drawing Sheets

PIVOTING RAMP FOR DYNAMIC LOAD/UNLOAD FILES

BACKGROUND OF THE INVENTION

The present application claims the benefit of earlier filed U.S. Provisional Application No. 60/010,313, entitled PIVOTING RAMP FOR DYNAMIC LOAD/UNLOAD FILES filed on Jan. 22, 1996.

The present invention relates generally to disc drive data storage systems, and more particularly, to a pivoting ramp for use in a disc drive data storage system to increase the amount of usable space on the disc surface while improving the reliability of dynamic loading/unloading of the slider carrying actuator.

Use of stationary outer diameter (OD) ramps for dynamically loading/unloading a slider carrying actuator in a disc drive data storage system is well known in the art. See for example the following references which are herein incorporated by reference: Morehouse et al., U.S. Pat. No. 4,933,785, entitled "Disk Drive Apparatus Using Dynamic Loading/Unloading;" Morehouse et al., U.S. Pat. No. 5,025,336, entitled "Disk Drive Apparatus"; Jeong, T. G. and Bogy, D. B., "An Experimental Study of the Parameters That Determine Slider-Disk Contacts During Dynamic Load-Unload," ASME Journal of Tribology, Vol. 114, pp. 507–514 (1992); and Levi, P. G., and Talke, F. E., "Load/Unload Investigations On A Rotary Actuator Disk Drive," IEEE Transactions On Magnetics, Vol. 28, No 5 (September 1992).

The use of dynamic load/unload is advantageous for a number of reasons. The benefits of dynamic load/unload include an improved ability of the data storage system to withstand non-operating shock, the realization of storage capacity improvements, improved interface stiction, improved durability, reduced start current requirements, and the enhancement of power saving modes of operation. The shock withstanding improvements stem from the fact that the sliders are not parked on the disc surface, thus slider impact on the disc surface is avoided. The capacity improvements are due to the elimination of texture, allowing the flying heights to be reduced and texture noise from the media to be minimized. Interface stiction and durability concerns are also minimized or eliminated since the slider does not contact the disc surface during start/stop. The power savings enhancements are derived from the ability to power down the actuator electronics while the disc pack continues to spin, which is difficult to do on a contact start/stop (CSS) drive given the flyability implications of extended track following.

While use of conventional OD ramps for dynamic load/unload provides the advantages described above, their use introduces a number of problems as well. A particularly significant problem introduced by existing OD ramps is their undesirable effect on tolerances. The tolerance problems introduced by conventional OD ramps result in reduced disc capacity and/or in increased reliability concerns for the loading process. For systems using a conventional OD ramp for dynamic load/unload, the low vertical velocity requirement for reliable loading necessitates the use of shallower ramps (lower ramp angles) to reduce the vertical loading velocity, and thereby to increase the loading reliability. The use of shallower ramp angles has a negative impact on tolerances and causes the last OD data track to be moved inward, thus reducing the drive capacity.

Therefore, there is a need for an improved ramp for use in dynamic loading/unloading of the slider carrying actuator which eliminates or minimizes the loss of drive capacity resulting from the use of conventional OD ramps while providing a reliable loading process.

SUMMARY OF THE INVENTION

A ramp is disclosed for use in a disc drive system for loading and unloading a magnetic slider carrying actuator. The actuator is rotatable about an actuator pivot and supports the magnetic slider over a first surface of a magnetic disc. The ramp includes a pivoting arm which rotates about a ramp pivot such that the pivoting arm moves toward an inner diameter of the first magnetic disc surface as the actuator rotates toward an outer diameter of the first magnetic disc surface during unloading of the actuator. A sloped region coupled to the pivoting arm is adapted for receiving the actuator during unloading as the pivoting arm moves toward the inner diameter and as the actuator moves toward the outer diameter.

DETAILED DESCRIPTION OF THE PREFERRED EMBODIMENTS

The present invention includes an apparatus and method for minimizing or eliminating the loss of drive capacity associated with the use of conventional stationary ramps for dynamic loading/unloading of the actuator in a disc drive data storage system. The loss of drive capacity exhibited in the prior art is contributed to tolerance considerations and to the low vertical velocity requirement for reliable loading. The method and apparatuses of the present invention overcome this loss of capacity by using a pivoting ramp to decouple the loading and unloading events. The ramp is biased such that the ramp is pivoted away from the actuator during normal operation. For unload, the actuator makes contact with the ramp and forces it under a tab either on the load beam or on an extension beyond the recording head. Loading is then accomplished by the actuator holding the ramp over the disc until the slider is loaded on the disc surface. The additional OD capacity provided by the present invention allows the loading reliability to be improved or maintained by decreasing the loading velocity.

Figure 1:
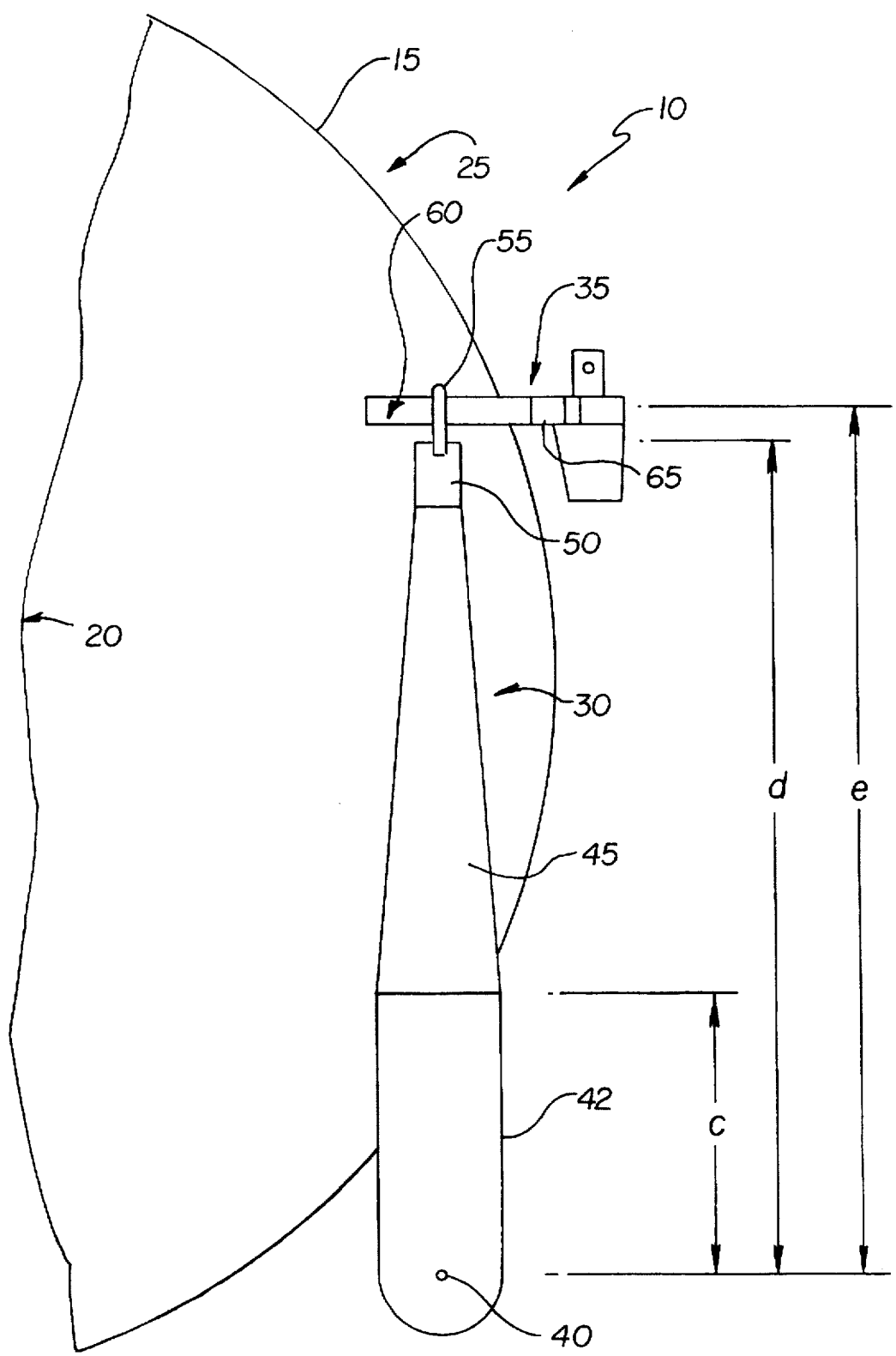
FIG. 1 is a diagrammatic top view of a prior art disc drive data storage system which uses a stationary ramp for dynamic loading and unloading of the slider carrying actuator.

FIG. 1 is a diagrammatic view illustrating a prior art data storage system which employs a stationary ramp for loading and unloading a slider carrying actuator. Data storage system 10 includes magnetic disc 15 having inner diameter ID (denoted generally at reference number 20) and outer diameter OD (denoted generally at reference number 25), actuator assembly 30 and stationary OD ramp 35. Actuator 30 includes pivot 40, base portion 42, load beam 45, slider carrying gimbal section 50 and unloading tab 55 attached to gimbal section 50. Stationary ramp 35 includes a sloped region 60 which forms an angle $\alpha_s$ with a plane parallel to magnetic disc 15 (i.e., a plane parallel to the plane of the page) such that the height of sloped region 60 increases toward OD 25 of disc 15. Ramp 35 also includes level region 65 adjacent to sloped region 60 for supporting actuator 30 in its fully unloaded position.

Actuator 30 is "unloaded" by rotating the actuator horizontally about pivot 40 toward the OD until unloading tab 55 comes into contact with sloped region 60 of ramp 35. Continued horizontal rotation of actuator 30 toward the OD moves tab 55 vertically and horizontally up sloped region 60 to a fully unloaded position on level region 65 of ramp 35. From its resting position on level region 65 of ramp 35, actuator 30 is "loaded" by rotating the actuator about pivot 40 and toward the ID until tab 55 has cleared the end of sloped region 60.

Vertical loading velocity is the dominant variable in dynamic load/unload. See for example, Jeong, T. G. and Bogy, D. B., "An Experimental Study of the Parameters That Determine Slider-Disk Contacts During Dynamic Load-Unload," ASME Journal of Tribology, Vol. 114, pp. 507–514 (1992) and Levi, P. G., and Talke, F. E., "Load/Unload Investigations On A Rotary Actuator Disk Drive," IEEE Transactions On Magnetics, Vol. 28, No 5 (September 1992). Vertical loading velocities of less than 20 mm/s appear to provide a reliable loading process. For stationary OD ramp 35 as shown in FIG. 1, the vertical loading velocity is given by:

$$V_v = V_a \frac{(d-c)}{(e-c)} \tan(\alpha) \qquad \text{Equation 1}$$

Where, $V_v$=the vertical loading velocity (i.e., the actuator velocity in a direction perpendicular and toward the plane of disc 15);

$\alpha$=the ramp angle;

=$\alpha_3$ for stationary ramp 35;

$V_a$=the horizontal actuator velocity (i.e., the actuator velocity in a direction parallel to the plane of disc 15);

c=the distance from the actuator pivot to the end of the actuator base portion and the beginning of the actuator load beam;

d=the distance from the actuator pivot to the end of the slider or gimbal section; and e=the distance from the actuator pivot to the center of the ramp.

It is clear that either ramp angle $\alpha$ or horizontal actuator velocity $V_a$ can be used to control vertical loading velocity $V_v$. Controlling horizontal actuator velocity $V_a$ is difficult given the fact that no servo feedback is available with the slider unloaded from the disc surface. The problem with controlling vertical loading velocity $V_v$ using ramp angle $\alpha$ is that decreasing the ramp angle increases the OD capacity loss on disc 15. Thus, a steep ramp angle is preferred to minimize this capacity loss.

The following simplified example and analysis illustrate the OD capacity tolerance loss of prior art OD ramp 35 used for dynamic load/unload. For a stationary ramp, the maximum outer data track radius $R_{SODDT}$ that can be used in a load/unload file can be written as:

$$R_{SODDT} = R_m - T_2 \left(\frac{d}{e}\right) - \frac{(T_1 + H_u)}{\tan\alpha} \frac{(e-c)}{(d-c)} \qquad \text{Equation 2}$$

Where $R_m$=the maximum safe flyable radius;

$T_2$=the value associated with the position of the ramp, disc and head gimbal assembly (HGA) associated with horizontal tolerances;

$T_1$=the value associated with the vertical tolerances; and $H_u$=the minimum amount or height the sliders are to be lifted from the disc surface.

Observing that the tangent of ramp angle $\alpha$ appears in the denominator of Equation 2, it is clear that, when using a stationary ramp, the best solution for maintaining the maximum outer data track radius $R_{SODDT}$ is to use a steep ramp (i.e., a ramp having a high ramp angle $\alpha_3$). Noting in Equation 1 that a steep ramp leads to a higher vertical loading velocity, a low horizontal actuator velocity $V_a$ with a steep ramp is preferred. Again, this is difficult due to the lack of feedback for actuator control.

Figure 2A:
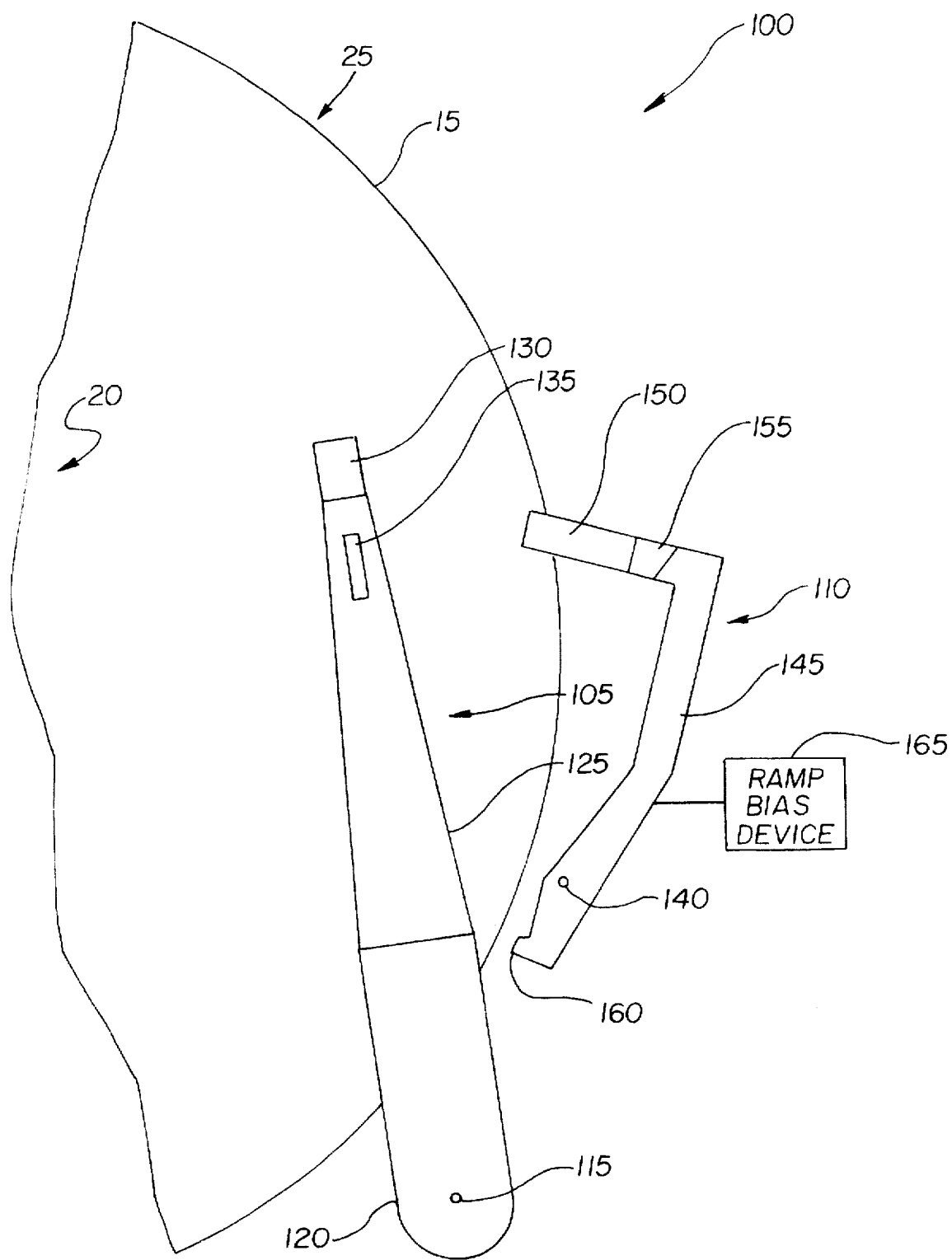
FIGS. 2A, 2B and 2C are diagrammatic top views of a first preferred embodiment of a disc drive data storage system which uses a pivoting ramp, in accordance with the present invention, for dynamic loading and unloading of the slider carrying actuator.
Figure 2B:
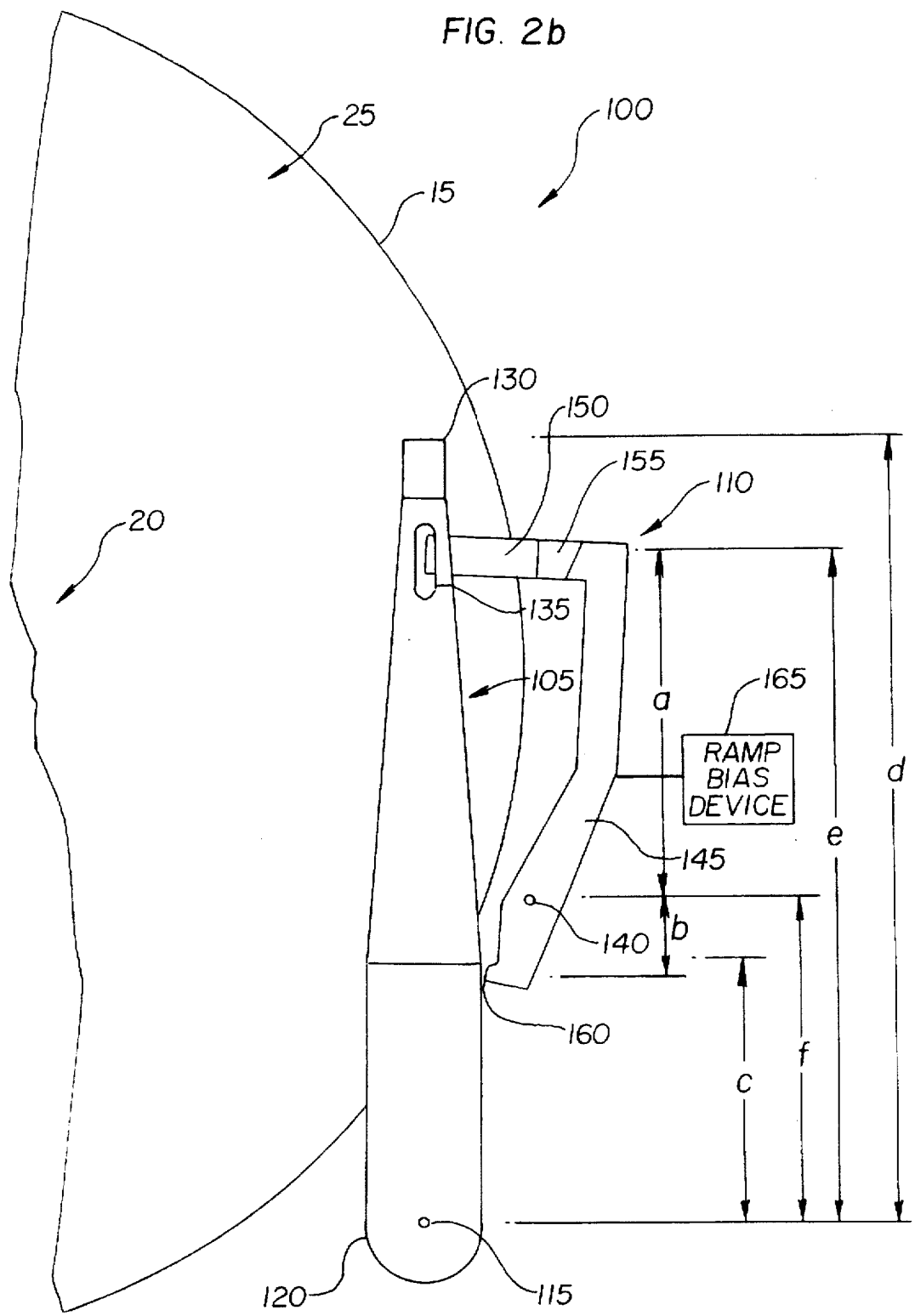
Figure 2C:
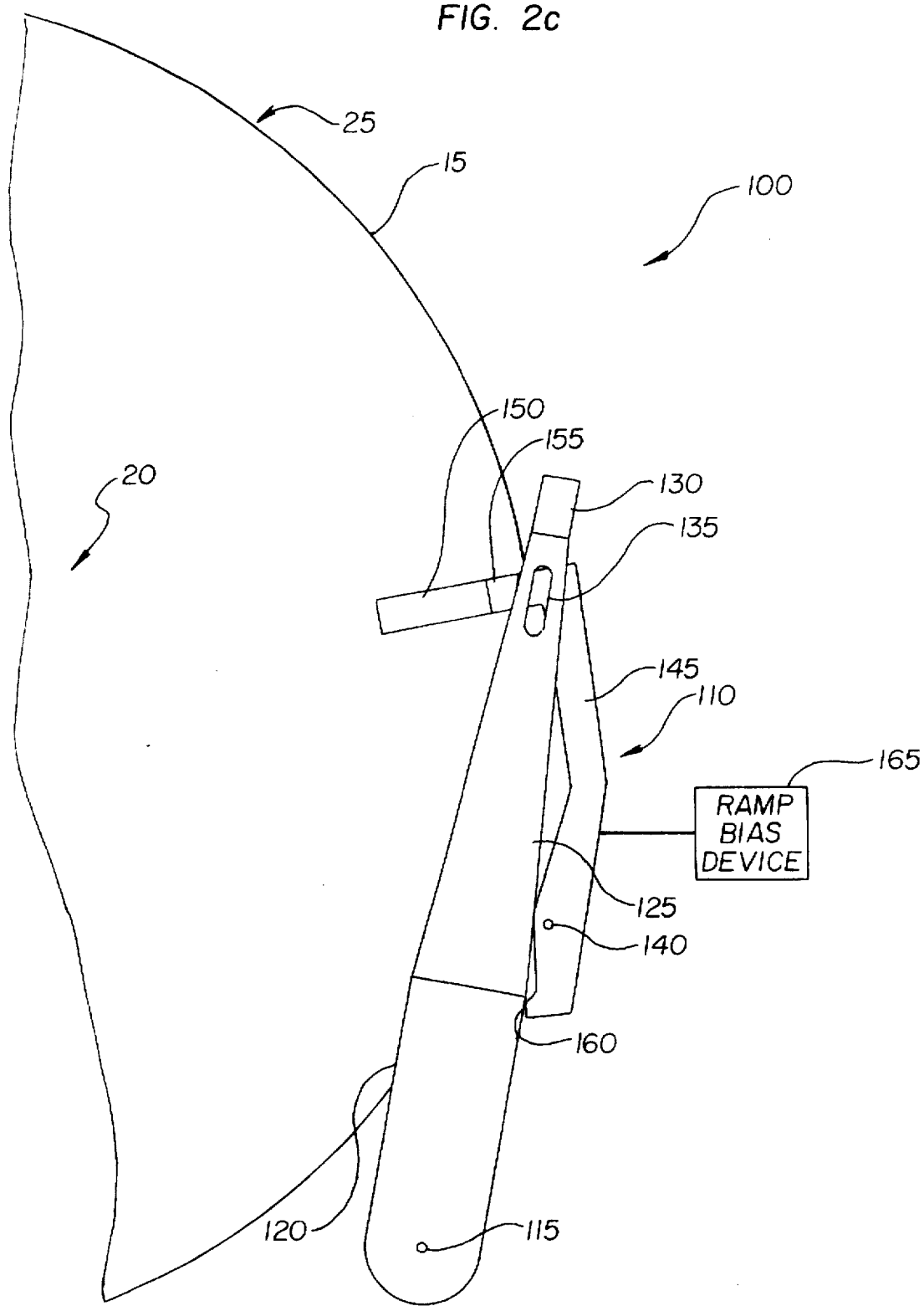

FIGS. 2A–2C are diagrammatic top views of a first preferred embodiment of a disc drive data storage system in accordance with the present invention. Data storage system 100 illustrated in FIGS. 2A–2C includes disc 15 having ID 20 and OD 25, actuator assembly 105, and pivoting ramp 110. Actuator 105 includes pivot 115, base plate 120, load beam 125, slider carrying gimbal section 130, and unloading button 135. Pivot 115 is coupled to or formed integrally with base plate 120 of actuator 105. Load beam 125 of actuator 105 is coupled to or formed integrally with base plate 120. Slider carrying gimbal section 130 is coupled to or formed integrally with load beam 125. Unloading button 135 is coupled to or formed integrally with the bottom side (i.e., the side facing disc 15) of load beam 125 or to the head gimbal assembly in general.

Pivoting ramp 110 includes pivot 140, pivot arm 145, sloped region 150, level region 155, lower extension 160, and ramp bias device 165. Ramp 110 is made from molded plastic or other suitable materials. Preferably, ramp 110 is made from a low friction polymer material. Pivot 140 is formed in, or is coupled to, pivot arm 145. Pivot 140 is a low friction pivot which, in preferred embodiments, includes a clearance hole in the ramp material with a pin fastened to the upper and lower covers along with a small thrust bearing. In the alternative, pivot 140 can be a small bearing, molded into the ramp 110, which is fastened to the top or bottom cover of the housing containing the data storage system. Further, pivot 140 can be integral balls, cast into the ramp material, which are placed in dimples in the top and bottom covers.

Pivot arm 145 is connected to level region 155. Level region 155 is connected to sloped region 150. Sloped region 150 of pivoting ramp 110 forms angle $\alpha_p$ with a plane parallel to magnetic disc 15 such that the height of sloped region 150 increases toward the OD of disc 15. In other embodiments, pivot arm 145 can act as level region 155. Also, in other embodiments, sloped region 150 can have multiple angles or slopes.

Ramp bias device 165 can be any of a variety of devices or mechanisms for biasing pivoting ramp 110 out toward the OD edge of disc 15. If ramp 110 is not sufficiently biased, the ramp could stay in the ID position after loading and cause the sliders to unload from the disc before reaching the OD data tracks. Likewise, if too much OD bias is applied, ramp 110 will not stay in the loading position during the load. Two constraints to this problem are: 1) creating a very low friction pivot 140 to eliminate hysteresis such that only very small bias forces are required; and 2) providing a small bias force that can easily be overcome by the forces exerted by the suspension during loading. In preferred embodiments, low friction pivot 140 as described above is used along with the windage of the disc pack to provide a small OD bias for the ramp. In other words, airflow from the disc is used to bias the ramp toward the OD. In the alternative, a mechanical spring (such as a small flex) can also be connected to ramp 110 and used as ramp bias device 165.

The primary difference between ramp 110 illustrated in FIGS. 2A–2C and ramp 35 illustrated in FIG. 1 is that ramp 110 is rotated during unloading, using the actuator to supply the pivoting force as shown in FIGS. 2B and 2C. When the file is operating, ramp 110 is biased into the OD position shown in FIG. 2A. Actuator 105 is positioned over disc 15 as the slider flies above the disc surface. As is illustrated in FIG. 2B, for an unload, actuator 105 moves toward the OD of disc 15 until it engages lower extension 160 of ramp 110, causing ramp 110 to rotate toward the ID of disc 15 and placing unloading button 135 under sloped region 150. As actuator 105 continues to pivot toward the OD and ramp 110 is forced to pivot further toward the ID, the unload is performed. Eventually, unloading button 135 of actuator 105 comes to rest on level portion 155 of ramp 110 as is illustrated in FIG. 2C.

For a load, the actuator is rotated toward the ID of disc 15. The frictional sliding of button 135 on the ramp creates a force sufficient to overcome the OD bias of ramp 110 provided by device 165. Thus, ramp 110 is held at the ID position (see FIG. 2C) until the actuator is dragged completely off of ramp 110. The OD bias provided by device 165 then returns ramp 110 to the OD position illustrated in FIG. 2A.

The advantage of this technique is that during unloading, the ramp is translating inward which creates a higher "effective ramp angle," depending upon the ramp and actuator layout. As is discussed below, this greatly improves the tolerance requirements. For loading, the ramp is eventually held stationary at its ID position, thus ramp angle $\alpha_p$ and actuator velocity $V_a$ define vertical loading velocity $V_v$. Since the loading process does not affect the tolerance allocation, a shallower ramp angle can be used to reduce the vertical loading velocity thereby increasing the loading reliability.

An advantageous feature of the present invention is the decoupling of the vertical loading and unloading velocities. The following discussion references the dimensions of the pivoting ramp of the present invention illustrated in FIG. 2B. Consider now the tolerances on the pivoting ramp illustrated in FIGS. 2A, 2B and 2C. When using pivoting ramp 110, the maximum outer data track radius $R_{PODDT}$ is set by the unloading condition and is given by:

$$R_{PODDT} = R_m - \left( T_2 \left( 1 + \frac{b}{a} \right) + T_2^* \left( \frac{b}{a} \right) \right) \left( \frac{d}{f-b} \right) - \frac{(T_1 + H_u + T_1^*)\left( \frac{e-c}{d-c} \right)}{\left[ \frac{e}{d} + \left( \frac{a}{b} \right) \left( \frac{f-b}{d} \right) \right] \tan\alpha_p} \quad \text{Equation 3}$$

Where, $T_1^*$ = additional vertical tolerance associated with the pivoting mechanism of the ramp;

$T_2^*$ = additional horizontal tolerance associated with the pivoting mechanism of the ramp;

$\alpha_p$ = the ramp angle for pivoting ramp 110;

a = the distance from the ramp pivot to the center of the pivoting ramp;

b = the distance from the ramp pivot to the lower extension of the pivoting ramp; and f = the distance from the ramp pivot to the actuator pivot.

Because ramp 10 is stationary during loading, the vertical loading velocity is given by Equation 1. The primary differences between Equations 2 (stationary ramp) and 3 (pivoting ramp) are the multiplier preceding the tangent term in the denominator, giving a "higher effective ramp angle", and the multiplier on the horizontal tolerances which is discussed after the following example.

EXAMPLE

As an example, consider the following assumed tolerance values for the simplified analysis of Equations 1–3.

$R_m = 23$ mm $T_1 = 200$ μm $T_1^* = 50$ μm  Equations 4

$T_2 = 200$ μm $T_2^* = 50$ μm $H_u = 100$ μm

Furthermore, assume that the maximum vertical loading velocity ($V_v^{max}$) and the minimum controllable actuator velocity ($V_a^{min}$) during loading are given by:

$V_v^{max} = 25$ mm/s  Equation 5

$V_a^{min} = 200$ mm/s

Finally, for the stationary ramp, assume the following values for the geometry defined in FIG. 1.

c = 9 mm d = 27 mm  Equation 6 e = 29 mm

Using the values of Equations 4–6, Equation 1 gives a stationary ramp angle $\alpha_s$ requirement of 7.9°. Using this value in Equation 2 gives an outer data track radius ($R_{SODDT}$) of 20.4 mm.

For the pivoting ramp, consider the same values as given in Equations 4–5, with the geometric variables illustrated in FIG. 2B having the values:

a = 12 mm b = 2.5 mm c = 9 mm  Equation 7 d = 27 mm e = 23 mm f = 11 mm

Using these values in Equation 1 gives a pivoting ramp angle $\alpha_p$ of 5.6°. Using this in Equation 3 gives a maximum $R_{PODDT}$ for a pivoting ramp of 21.0 mm, a 0.6 mm improvement over the stationary ramp. It should be noted that the OD loss due to the vertical tolerances was reduced by 1.2 mm by using the pivoting ramp. However, the loss was increased by 0.6 mm due to the horizontal tolerances. Thus, this technique works exceptionally well where the horizontal tolerances are more controllable than the vertical tolerances.

Figure 3:
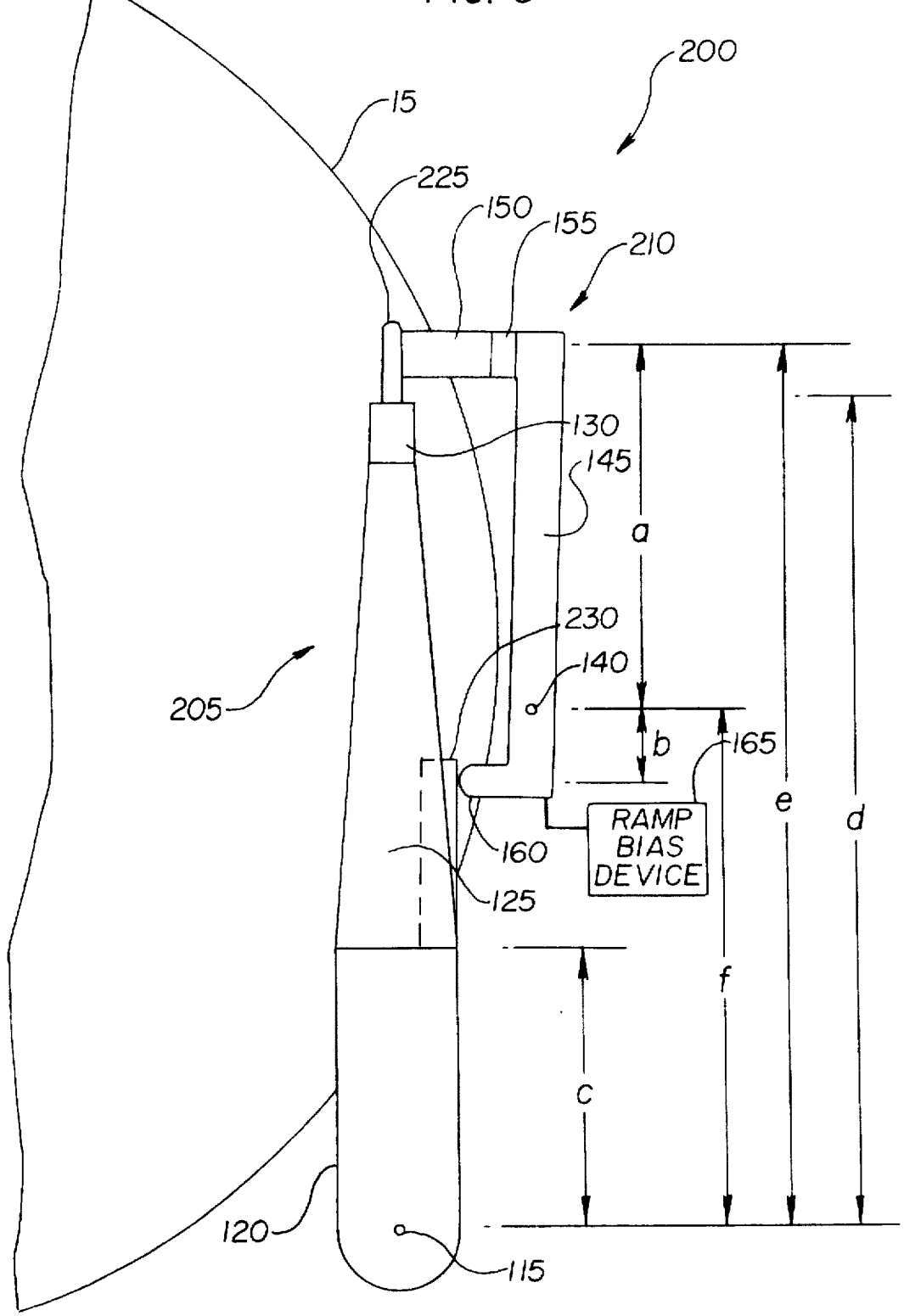
FIG. 3 is a diagrammatic top view of a second preferred embodiment of a disc drive data storage system which uses a pivoting ramp, in accordance with the present invention, for dynamic loading and unloading of the slider carrying actuator.

Given the above observations, consider the pivoting ramp case where the ramp is positioned further from the actuator pivot, as is the case with ramp 210 shown in FIG. 3. FIG. 3 is a diagrammatic top view of a disc drive data storage system in accordance with alternate embodiments of the present invention. Data storage system 200 illustrated in FIG. 3 includes disc 15, actuator assembly 205, and pivoting ramp 210. Actuator 205 is similar to actuator 105 illustrated in FIGS. 2A–2C in that it includes pivot 115, base plate 120, load beam 125, and slider carrying gimbal section 130. Actuator assembly 205 differs from actuator assembly 105 in that it does not include unloading button 135, and in that it does include unloading tab or extension 225 and extension 230. Unloading tab or extension 225 is attached to slider carrying gimbal section 130 and is needed for supporting actuator 205 on ramp 210 due to ramp 210 being moved further from actuator pivot 115. Also needed as a result of ramp 210 being moved further from actuator pivot 115 is extension 230 for making contact with lower extension 160 of ramp 210.

Although shaped slightly differently to accommodate its new position relative to actuator pivot 115, pivoting ramp 210 has the same components as pivoting ramp 110 illustrated in FIGS. 2A–2C and therefore includes pivot 140, pivot arm 145, sloped region 150, level region 155, lower extension 160, and ramp bias device 165. Once again, the most significant difference between pivoting ramps 110 and 210 is that pivot 140 (and the rest of ramp 210 as well) is positioned further from pivot 115 of actuator 115.

Using the following geometric values corresponding to ramp 210:

$$a=12 \text{ mm}$$
$$b=2.5 \text{ mm}$$
$$c=9 \text{ mm} \quad\quad\quad \text{Equation 8}$$
$$d=27 \text{ mm}$$
$$e=29 \text{ mm}$$
$$f=17 \text{ mm}$$

it can be shown that pivoting ramp angle $\alpha_p$ becomes 7.9° and $R_{PODDT}$ becomes 21.76 mm, an improvement of 1.4 mm over the stationary ramp. For a 1.8" file with full banding, this translates into a 20 percent gain in capacity. This analysis also illustrates another advantage of the present invention. The additional design flexibility provided by the present invention allows the layout to be tailored to minimize the OD data capacity loss rather than being fixed by the maximum loading speed and the minimum actuator velocity.

Another advantage of the technique and apparatuses of the present invention is the potential to unload from beneath the load beam, as shown by unloading button 135 in FIGS. 2A–2C. This comes from the ability to use a shallower ramp and the requirement of avoiding twist of the load beam (and hence static roll). The avoidance of load beam twist implies that the ramp must apply the lifting force at the shear center of the load beam. Given the small suspension/disc spacing and the required width of the load beam, steeper ramp angles will not fit between the disc and the slider. The option to eliminate the unloading tab or extension required in the prior art translates into a simpler design by removing the tab requirements from the load beam (which also interferes with the pad layout and wiring), allowing the load beam to be stamped with the required geometry, and decreasing the inertia of the HGA assembly. A potential improvement in height tolerance may also be realized both from the simplicity and from the magnification of lift by using the load beam (i.e., the ramp height is lower since the slider lift is magnified by the geometry).

Although the present invention has been described with reference to preferred embodiments, workers skilled in the art will recognize that changes may be made in form and detail without departing from the spirit and scope of the invention.

What is claimed is:

1. A disc drive data storage system comprising:

a data storage disc having a first surface, the first surface of the magnetic disc having an inner diameter and an outer diameter;

an actuator for supporting a head slider over the first surface of the magnetic disc, the actuator being rotatable about an actuator pivot toward the actuator inner and outer diameters, the actuator having a load beam coupled to the actuator pivot, a gimbal section coupled to the load beam for carrying the slider, and a first elongated actuator extension coupled to and located underneath the load beam; and a ramp loading and unloading the actuator, the ramp pivoting about a ramp pivot such that the ramp moves toward the inner diameter as the actuator moves toward the outer diameter during unloading of the actuator, the ramp includes a pivoting arm coupled to the ramp pivot and a ramp extension coupled to the pivoting arm, the ramp extension making contact with the first actuator extension as the actuator moves toward the outer diameter during unloading, such that contact between the first actuator extension and the ramp extension causes the ramp to rotates about the ramp pivot to move the ramp toward the inner diameter during unloading;

a level region coupled to the pivoting arm; and a sloped region coupled to the level region, the sloped region forming a ramp angle with a plane parallel to the first surface of the data storage disc, the sloped region receiving the actuator during unloading of the actuator as the ramp moves toward the inner diameter and as the actuator moves toward the outer diameter;

a means for biasing the ramp toward the outer diameter such that the ramp remains at an outer diameter position until contact occurs between the actuator and the ramp extension;

a second actuator extension coupled to the gimbal section, the second actuator extension received by the sloped region of the ramp during unloading of the actuator as the ramp moves toward the inner diameter and as the actuator moves toward the outer diameter.

2. The disc drive data storage system of claim 1, wherein the means for biasing the ramp toward the outer diameter includes a spring coupled to the pivoting arm of the ramp.

* * * * *